United States Patent
Frailey

(10) Patent No.: US 9,403,290 B2
(45) Date of Patent: Aug. 2, 2016

(54) VALVES FOR CREATING A FOAM MATERIAL

(76) Inventor: Scott Frailey, Anderson, SC (US)

( * ) Notice: Subject to any disclaimer, the term of this patent is extended or adjusted under 35 U.S.C. 154(b) by 126 days.

(21) Appl. No.: 13/547,746

(22) Filed: Jul. 12, 2012

(65) Prior Publication Data

US 2013/0175306 A1 Jul. 11, 2013

Related U.S. Application Data

(60) Provisional application No. 61/506,672, filed on Jul. 12, 2011.

(51) Int. Cl.
*B29B 7/76* (2006.01)
*B01F 5/06* (2006.01)
*B01F 13/00* (2006.01)
*B01F 15/02* (2006.01)
*B01F 3/04* (2006.01)
*A62C 5/02* (2006.01)

(52) U.S. Cl.
CPC ........... *B29B 7/7663* (2013.01); *B01F 3/04446* (2013.01); *B01F 5/0608* (2013.01); *B01F 5/0688* (2013.01); *B01F 13/002* (2013.01); *B01F 15/0238* (2013.01); *A62C 5/024* (2013.01)

(58) Field of Classification Search
CPC ...... B65D 83/682; B65D 83/06; B65D 83/32; B65D 83/38; B05B 7/0037; B05B 11/3001; B05B 7/0483; B29B 7/7663; A62C 5/02; A62C 5/002; B01L 1/50; B67D 1/0412; A21C 9/04; A47G 19/24; A47G 19/32; B01F 5/0608; B01F 13/002; B01F 3/04446; B01F 15/0238
USPC .......... 222/190, 402.18, 145.5, 136, 222/189.01–189.05, 189.06–189.11, 222/321.1–321.9, 459, 401–402.25, 394, 222/399; 239/432; 169/14, 15
See application file for complete search history.

(56) References Cited

U.S. PATENT DOCUMENTS

| | | | | | |
|---|---|---|---|---|---|
| 2,208,490 | A | * | 7/1940 | Axtell et al. | 169/88 |
| 2,552,857 | A | * | 5/1951 | Knapp | 222/547 |
| 2,976,897 | A | * | 3/1961 | Beckworth | 141/17 |
| 3,065,883 | A | * | 11/1962 | Nelson | 222/323 |
| 3,306,540 | A | * | 2/1967 | Reichert | B29B 7/421 239/142 |
| 3,420,418 | A | * | 1/1969 | Bennett et al. | 222/399 |
| 3,422,993 | A | * | 1/1969 | Boehm et al. | 222/190 |
| 3,471,064 | A | * | 10/1969 | Micallef | 222/211 |
| 3,497,112 | A | * | 2/1970 | Samuelson | 222/148 |
| 3,559,890 | A | * | 2/1971 | Brooks | B05B 7/1209 239/304 |
| 4,027,789 | A | * | 6/1977 | Dickey | A61M 11/00 222/190 |
| 5,071,379 | A | * | 12/1991 | Poizot | A47K 5/14 210/493.1 |
| 7,201,293 | B2 | * | 4/2007 | Iizuka et al. | 222/145.6 |
| 9,120,108 | B2 | * | 9/2015 | Hofte | B05B 7/0037 |
| 2013/0037277 | A1 | * | 2/2013 | Henry | B01F 5/0428 169/14 |

FOREIGN PATENT DOCUMENTS

GB 2021698 A * 12/1979 ............... 222/402.18

* cited by examiner

Primary Examiner — Kevin P Shaver
Assistant Examiner — Robert Nichols, II
(74) Attorney, Agent, or Firm — Nelson Mullins Riley & Scarborough LLP

(57) ABSTRACT

A valve for forming a foam from a fluid, the valve includes an outer valve wall including a first end and a second end in fluid communication with each other and defining a chamber within the valve; an air intake bore intermediate outer valve wall first end and outer valve wall second end that provides fluid communication between a space outside of valve and the chamber; and at least two barriers within the chamber, wherein each of the at least two barriers defines an aperture.

10 Claims, 5 Drawing Sheets

VALVES FOR CREATING A FOAM MATERIAL

CROSS-REFERENCE TO RELATED APPLICATIONS

This applications claims the benefit under 35 U.S.C. §119(e) of U.S. Provisional Application No. 61/506,672 filed Jul. 12, 2011, the entirety of which is hereby incorporated by reference.

FIELD OF THE INVENTION

The present invention relates generally to valves for use in forming fluids into foam material. More particularly, the present invention relates to valves that may be placed in pressurized containers of fluid to form a foam material.

SUMMARY OF THE INVENTION

According to an aspect, the present invention is directed to a valve for forming a foam from a fluid, the valve including: an outer valve wall comprising a first end and a second end in fluid communication with each other and defining a chamber within the valve; an air intake bore intermediate outer valve wall first end and second end that provides fluid communication between a space outside of valve and the chamber; and at least two barriers within the chamber, wherein each of the at least two barriers includes an aperture.

According to another aspect, the present invention is directed to a pressurized container including: an outer surface defining a container space within, wherein the container space comprises a pressurized gas and fluid; an outlet port that provides fluid communication between a position outside of the pressurized container and the container space; a valve within the container space including: an outer valve wall comprising a first end and a second end in fluid communication with each other and defining a chamber within the valve; an air intake bore intermediate outer valve wall first end and second end that provides fluid communication between the container space and the chamber; and at least two barriers within the chamber, wherein each of the at least two barriers includes an aperture; a fluid tube within the container space that is in fluid communication with the fluid of the pressurized container; and wherein the fluid tube is in further communication with the valve wall first end and the outlet port is in further fluid communication with the valve wall second end.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention is set forth in the specification, which refers to the appended figures, in which.

Figure 1:
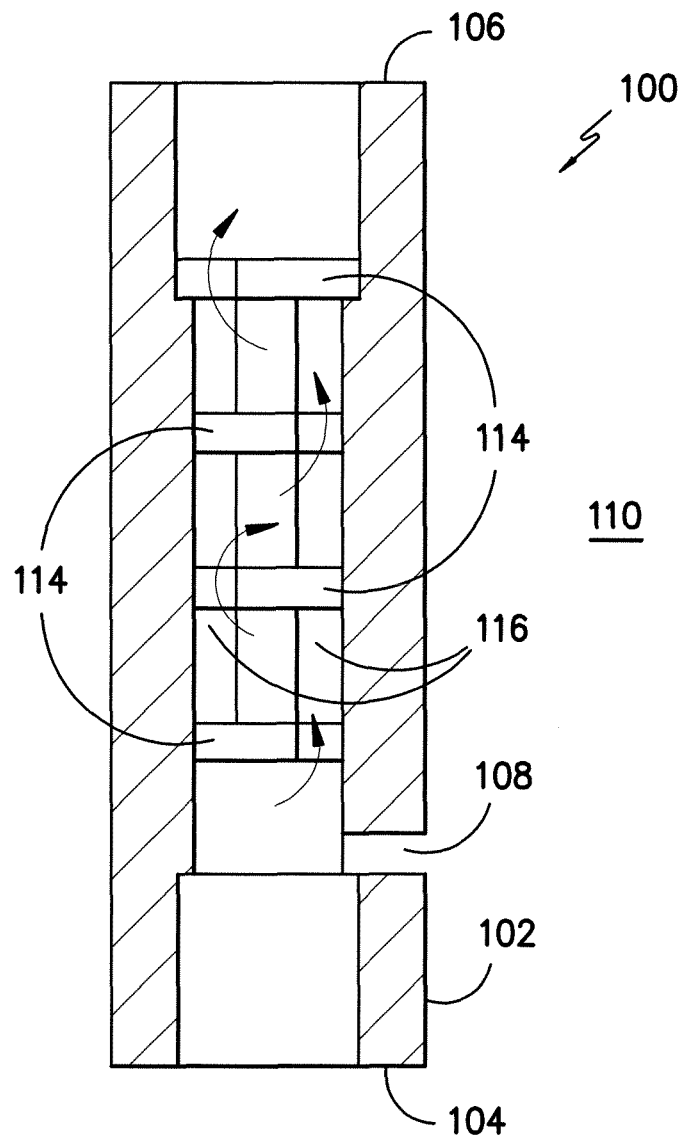
FIG. 1 is a side cross-sectional view of a valve in accordance with a first embodiment of the present invention.

Repeat use of reference characters in the present specification and drawings is intended to represent same or analogous features or elements of the invention.

DETAILED DESCRIPTION OF THE EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
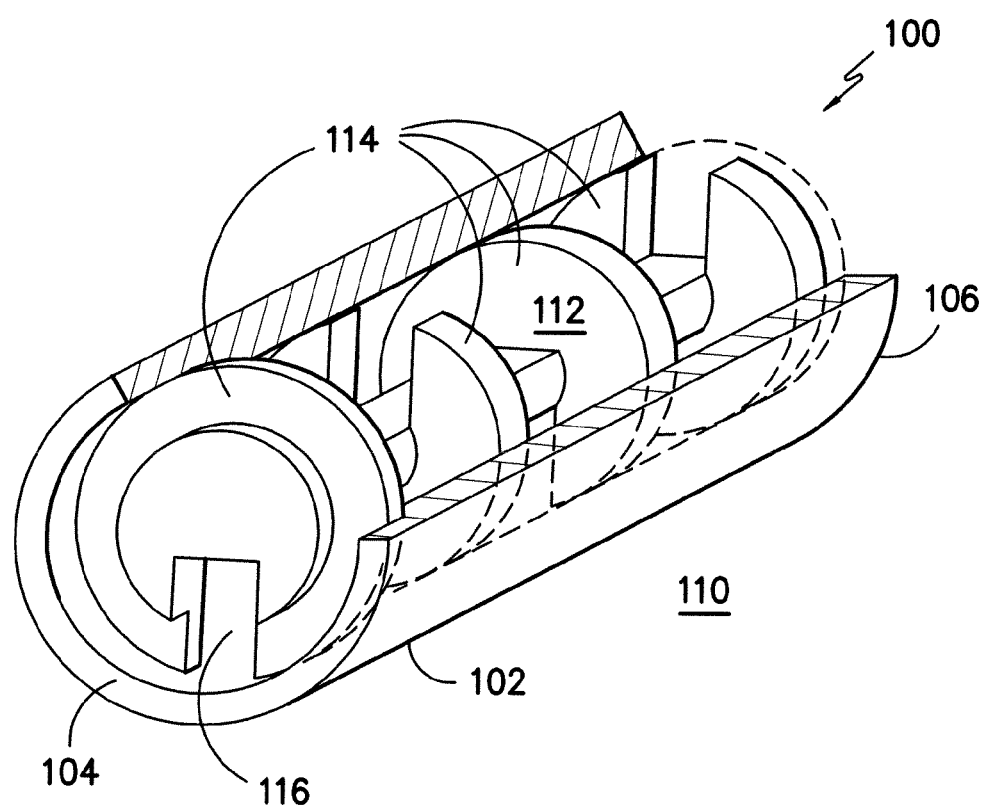
FIG. 2 is a perspective cross-sectional view of the valve of FIG. 1.

The present invention relates to improved valves for use in creating foam from a fluid that may be used in connection with fire extinguishers, pressurized water containers, compressed air tanks, and other containers. As more fully explained below, valves of the present invention are constructed such that foam may be created as fluid moves through them. FIGS. 1 and 2 illustrate a first embodiment of the valve 100 of the present invention. As shown in the referenced figures, valve 100 includes an outer valve wall 102 with a first end 104 and a second end 106 and an air intake 108 intermediate first and second ends 104,106. Although valve wall 102 of the first embodiment is shown as being cylindrical in shape, in other embodiments, valve wall 102 may be constructed of any shape based on the user's specifications. For example, in some embodiments, valve wall 102 may be oblong, oval, square, triangular, rectangular, trapezoidal, an irregular shape, or others known in the art. The user's specifications may dictate the particular shape utilized.

As further shown in FIG. 1, air intake 104 is a hole or bore in outer valve wall 102 that establishes fluid communication between an external portion 110 of valve 100 and an internal portion 112 of valve 100. In some embodiments, air intake 108 may be positioned such that when a gas enters valve 100 through air intake 108, the gas is forced into a swirling motion within valve wall 102. Such action may be accomplished by boring air intake 108 at a particular angle, as this may increase the mixing and turbulence within valve 100, thus contributing to improved foaming. In such embodiments, air intake 108 may be a hole or bore in valve wall 102 which is positioned at an angle between about 0° and about 90° based on a position on valve wall 102.

As more clearly shown in FIG. 2, internal portion 112 of valve 100 includes a series of spaced barriers 114 each with at least one aperture 116. As shown in FIG. 2, barriers 114 may be shaped in order to conform to the shape of internal portion 112 of valve 100. In such embodiments, apertures 116 of the present invention may be of any shape to meet the specifications of the user. For example, round, square, rectangular, triangular, or other shaped apertures 116 may be utilized. However, in additional embodiments, barriers 114 may be constructed in a shape that is different from internal portion 112 of valve 100. For example, barriers 114 may be constructed in a triangular shape, while internal portion 112 may be cylindrical in shape. In such embodiments, the variation in shape between barriers 114 and internal wall 112 may naturally create apertures 116 of barriers 114.

Valve 100 may include any number of spaced barriers 114 based on the specifications of the user. For example, and as shown in FIGS. 1 and 2, valve 100 may include four spaced barriers 114. In additional embodiments, the number of spaced barriers 114 within valve 100 may range between about two and about thirty. In other embodiments, the number of barriers 114 within valve may range between about three and about twenty. The number of barriers 114 may vary based upon the particular application and size of valve utilized.

In some embodiments of the invention, to aid in the foaming process, apertures 116 of adjacent spaced barriers 114 may be off-set from one another. For example and as clearly shown in FIG. 2, apertures 116 may be off-set by about 180° from one another. In additional embodiments, apertures 116 of adjacent spaced barriers 114 may be off-set between about 45° and about 180°. As indicated above, the off-set nature of apertures 116 between adjacent spaced barriers 114 may force the fluid mixture that moves through the valve to be forced in varying directions, thereby aiding in the foaming process.

In some embodiments of the present invention, spaced barriers 114 may be fixedly attached to valve wall 102 such that they are stationary within valve 100. In additional embodiments, however, spaced barriers 114 may be rotatable or mobile within valve wall 102, such that additional movement may be employed to create additional foaming of the fluid.

Valves of the present invention may be manufactured or produced using any method known in the art. For example, the valves may be manufactured via a manual lathe or milling machine, a CNC lathe or milling machine, plastic injection, blow molding, casting in a foundry, cut out by an EDM machine, water jet machine, plasma machine, or laser machine, punch pressed, stamped out through a set of dies, printed in a 3D modeling printer, vacuum formed, or swaged or crimped in forming dies.

In addition, any materials known in the art may be utilized to form the valves of the present invention. The skilled artisan will understand that the materials utilized may vary based upon the particular application. The materials may include ferrous and non-ferrous metals (for example: steel, aluminum, brass, bronze, lead, nickel, stainless steel, silver, gold, pewter, titanium, platinum, iron, copper, tin, zinc and others), plastics generally (for example: ABS, PVC, CPVC, acrylic, polypropylene, polycarbonate and others), fiberglass-reinforced plastics, Micarta, phenolic materials, carbon fiber, glass, resins, epoxies, plexiglass, graphite and/or others.

Figure 3:
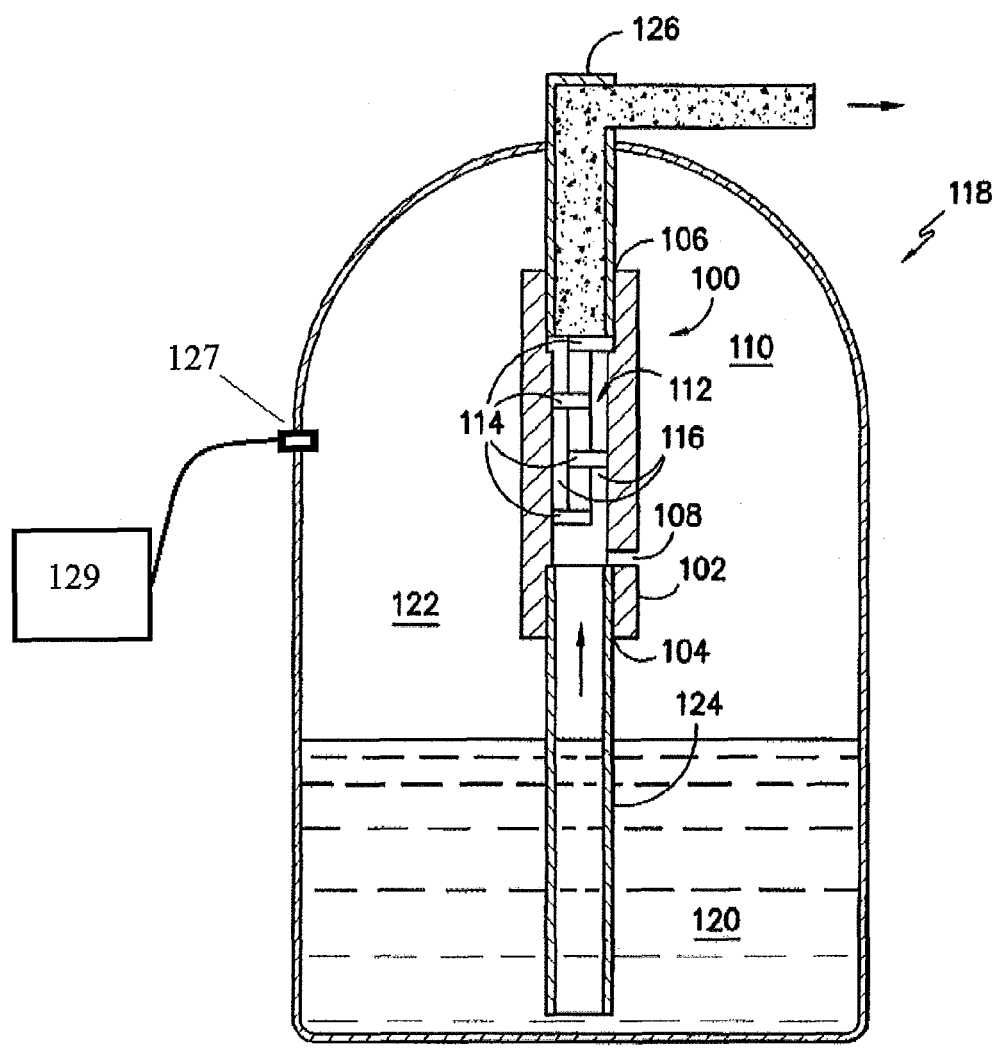
FIG. 3 is a side cross-sectional view of the valve of FIG. 1 placed in a pressurized container.

Valve 100 may be included in any type of pressurized container 118 that includes both a fluid 120 and pressurized gas 122, as mentioned above and as shown in FIG. 3. Within such a container 118, valve wall first end 104 may be in fluid communication with a fluid tube 124 that is in further fluid communication with fluid 120 located within pressurized container 118. In addition, valve wall second end 106 may be in fluid communication with an outlet port 126 of pressurized container 118 that provides an outlet from pressurized container 118 to the atmosphere. Although FIG. 3 illustrates a connector 127 connecting the pressurized container 118 to an external source of pressurized gas 129, in other embodiments, pressurized container 118 may include a localized source of pressurized gas. In accordance with certain embodiments illustrated by, for example, FIG. 3, the external source of pressurized gas 129 that may be fed through an air compressor or other known device.

In some embodiments of the invention, the fluid 120 of pressurized container 118 may further include a foaming agent to aid in the foaming process. For example, in some embodiments, surfactants such as sodium laureth sulfate or sodium lauryl ether sulfate may be utilized in the fluid 120 of pressurized container 118 to aid in the foaming process.

In addition, the pressurized gas 122 may be any known gas that may be utilized in such pressurized situations. For example, air, helium, or other known gasses may be utilized. In addition, the pressurized gas utilized in connection with the present invention may be at a pressure between about 10 psi and about 4500 psi. The particular pressure of the pressurized gas may vary based on the dimensions of the valve and the pressurized container.

In operation, pressurized gas 122 of pressurized container 118 is activated such that fluid 120 is forced though fluid tube 124 and into valve wall first end 104. In addition, pressurized gas 122 is further forced through air intake 108 and makes contact with fluid 120 that has entered valve wall first end 104. As fluid 120 and pressurized gas 122 are combined and move from valve wall first end 104 to valve wall second end 106 through apertures 116 of spaced barriers 114, a resulting foam is created that exits outlet port 126 and enters the atmosphere.

Figure 4:
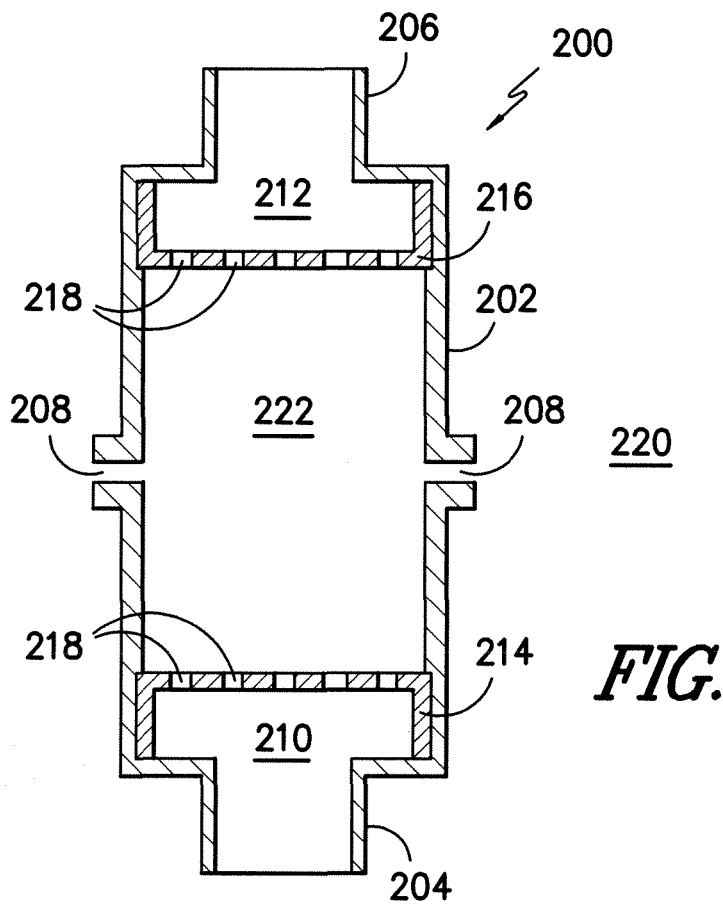
FIG. 4 is a side cross-sectional view of a valve in accordance with a second embodiment of the present invention.
Figure 5:
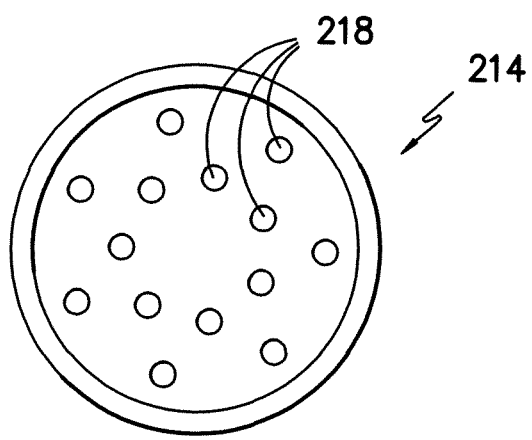
FIG. 5 is a top view of a first barrier from the valve of FIG. 4.

FIGS. 4 and 5 illustrate a second embodiment of the valve 200 of the present invention. Valve 200 includes a valve wall 202 with a first end 204 and a second end 206 and an air intake 208 proximate first and second ends 204, 206. As shown in FIG. 4, valve wall 202 may be, in some embodiments, tapered at first and second ends 204, 206. Such tapering may allow ends 204, 206 to properly adapt to the specification of a fluid tube and exit port within a pressurized container, as further explained below, and/or may also add additional force to the movement of a fluid to aid in the foaming process.

Valve 200 further includes first and second mixing areas 210, 212 proximate first and second ends 204, 206 that are confined by first and second barriers 214, 216 as shown in FIG. 4. First and second barriers 214, 216 further include at least one aperture 218 that establishes fluid communication between valve wall first and second ends 204, 206. The number and size of apertures 218 may vary based on the particular use of the present invention and the embodiment illustrated in FIGS. 4 and 5 only serves as an example of an available embodiment.

As shown in the figures, first and second barriers 214, 216 may be configured to conform to the shape of valve wall 202 or may be constructed of a different shape than valve wall 202 such that apertures 218 are provided naturally, as discussed above with respect to the first embodiment. In addition and as shown in the figures, first and second barriers 214, 216 may be constructed in a U-Shape and may be fixedly attached to valve wall 202 or, in other embodiments, may consist of a singularly-flat piece that may be adhered to valve walls 202 by any known method in the art.

Air intake 208 of valve 200 is a hole or bore in valve wall 202 that establishes fluid communication between an external portion 220 of valve 200 and an internal portion 222 of valve 200. In some embodiments, as discussed above with respect to the first embodiment, air intake 208 may be a bore or hole at a particular angle that allows for gas to enter valve 200 in a swirling motion. In such embodiments, air intake 208 may be a hole or bore in valve wall 202 which is positioned at an angle that may be between about 0° and about 90° based on the position of valve wall 202.

Figure 6:
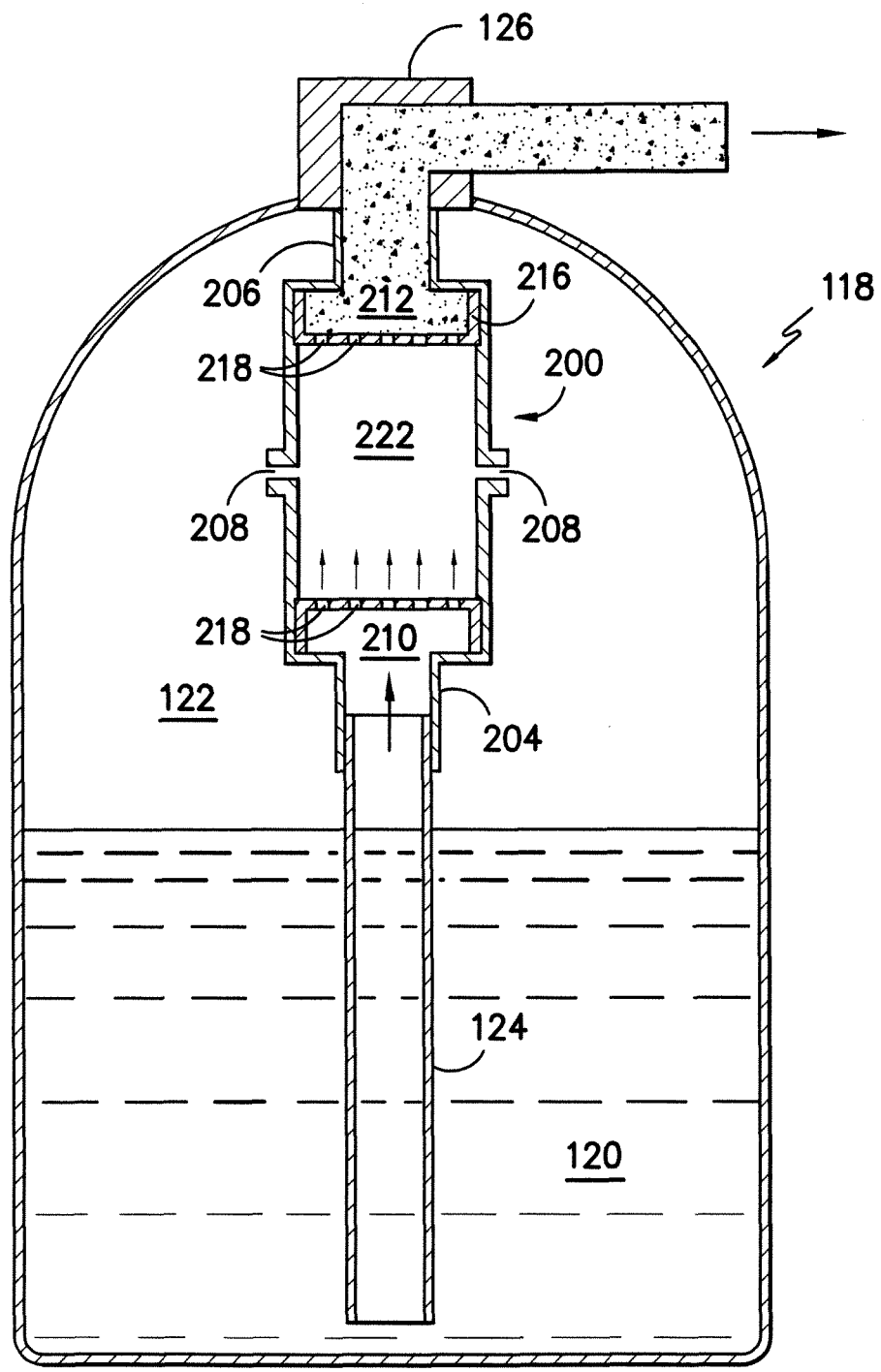
FIG. 6 is a side cross-sectional view of the valve of FIG. 4 placed in a pressurized container.

Valve 200 may be included in any number of pressurized containers 118 that include both a fluid 120 and a pressurized gas 122, as mentioned above with respect to the first embodiment and as shown in FIG. 6. Within such a container 118, valve wall first end 204 may be in fluid communication with a fluid tube 124 that is in further fluid communication with fluid 120 located within pressurized container 118. In addition, valve wall second end 206 may be in fluid communication with an outlet port 126 of pressurized container 118 that provides an outlet from pressurized container 118 to the atmosphere.

In operation, pressurized gas 122 of pressurized container 118 is activated such that fluid 120 is forced though fluid tube 124 into valve wall first end 204 and first mixing area 210 and then through apertures 218 of first barrier 214. Pressurized gas 122 is further forced through air intake 208 and contacts fluid that has exited apertures 218 of first barrier 214. As fluid 120 and pressurized gas 122 combine, the mixture moves through apertures 218 of second barrier 216 and into second mixing area 212 creating a foam material that exits pressurized container 118 through valve wall second end 206 and outlet port 126.

Although the valves of the present invention have been shown in connection with a pressurized container, in other embodiments, valve may be utilized without such a container. In such embodiments, the valves of the present invention may have feeds of fluid from an external source through their respective first ends and may also include a feed of pressurized gas from an external source into their respective air intakes. Further, in such embodiments, the aforementioned first ends and air intakes may include appropriate fittings known in the art that could allow fluid connection to such external sources.

The valves and pressurized containers of the present invention have many applications and may be used in the aerosol industry, the fire fighting industry, the automotive industry, the aerospace industry, or any other industry known in the art to have a need for liquid foaming. For example, in an embodiment, the valves and pressurized containers of the present invention may be used to foam and expand a solution to exhaust, prevent, or control fire.

The devices of the present invention further simplify current methods used to foam liquid. As such, the inventive device requires fewer or no hoses, ball valves, check valves, and plumbing, in general, and provides suitable foam expansion of a fluid as compared to other methods. In addition, other benefits of the internal valve of the invention include that the valve may not be tampered with, modified by unauthorized individuals, or damaged as easily as an external valve, and the valve and the plumbing will not be exposed to environmental elements.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. A pressurized container for forming a foam from a fluid, the pressurized container comprising:
   i. an outer surface defining a container space within, wherein the container space comprises a pressurized gas and fluid;
   ii. an outlet port that provides fluid communication between a position outside of pressurized container and the container space;
   iii. a valve within the container space comprising:
      1. an outer valve wall comprising a first end and a second end in fluid communication with each other and defining a single valve chamber within the valve;
      2. an air intake bore intermediate the outer valve wall first end and outer valve wall second end that provides fluid communication between the container space and the single valve chamber; and
      3. a series of at least two spaced apart barriers within the single valve chamber, wherein each of the barriers includes an aperture, and wherein the barriers are rotatable within the single valve chamber;
   iv. a fluid tube within the container space that is in fluid communication with the fluid of the pressurized container; and
      wherein the fluid tube is in further communication with the valve wall first end and the outlet port is in further fluid communication with the valve wall second end.

2. The pressurized container of claim 1, wherein the outer valve wall and the at least two barriers are of the same shape.

3. The pressurized container of claim 1, wherein the outer valve wall and the at least two barriers are of different shapes.

4. The pressurized container of claim 1, wherein the air intake bore is positioned at an angle between about 0° and about 90° based on the outer valve wall.

5. The pressurized container of claim 1, wherein the apertures of at least two adjacent barriers are off-set by about 180°.

6. The pressurized container of claim 1, wherein the valve includes two barriers where a first barrier is located proximate the valve wall first end and a second barrier is located proximate the valve wall second end and wherein the area between valve wall first end and first barrier defines a first mixing space and the area between valve wall second end and second barrier defines a second mixing space.

7. The pressurized container of claim 1, wherein the pressurized container further comprises a connector for connection to an external source of pressurized gas.

8. The pressurized container of claim 1, wherein the spaced apart barriers are substantially planar.

9. The pressurized container of claim 8, wherein the spaced apart barriers are positioned substantially parallel to each other.

10. A method of forming a foam from a fluid, the method comprising:
   i. providing a pressurized container comprising:
      1. an outer surface defining a container space within, wherein the container space comprises a pressurized gas and fluid;
      2. an outlet port that provides fluid communication between a position outside of pressurized container and the container space;
      3. a valve within the container space comprising:
         a. an outer valve wall comprising a first end and a second end in fluid communication with each other and defining a single valve chamber within the valve;
         b. an air intake bore intermediate the outer valve wall first end and outer valve wall second end that provides fluid communication between the container space and the single valve chamber; and
         c. at least two barriers within the single valve chamber, wherein each of the at least two barriers includes an aperture, and wherein the barriers are rotatable within the single valve chamber;
4. a fluid tube within the container space that is in fluid communication with the fluid of the pressurized container; and
wherein the fluid tube is in further communication with the valve wall first end and the outlet port is in further fluid communication with the valve wall second end; and
ii. applying pressure to the pressurized gas of the pressurized container and allowing fluid to enter the fluid tube and form a foam.

* * * * *